(12) United States Patent
Liao

(10) Patent No.: US 6,724,683 B2
(45) Date of Patent: Apr. 20, 2004

(54) TRANSFERRING DATA BETWEEN DIFFERENT CLOCK DOMAINS

(75) Inventor: William Liao, Dublin, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 17 days.

(21) Appl. No.: 10/093,155

(22) Filed: Mar. 6, 2002

(65) Prior Publication Data

US 2003/0169644 A1 Sep. 11, 2003

(51) Int. Cl.[7] .................................................. G11C 8/00
(52) U.S. Cl. ...................................... 365/233; 365/239
(58) Field of Search .................................. 365/233, 239

(56) References Cited

U.S. PATENT DOCUMENTS

| | | | | |
|---|---|---|---|---|
| 4,674,032 A | * | 6/1987 | Michaelson | 711/169 |
| 5,768,624 A | * | 6/1998 | Ghosh | 710/53 |
| 6,338,127 B1 | * | 1/2002 | Manning | 711/167 |

* cited by examiner

Primary Examiner—Michael S. Lebentritt
Assistant Examiner—Tuan T. Nguyen

(74) *Attorney, Agent, or Firm*—Michael Shenker; MacPherson Kwok Chen & Heid LLP

(57) ABSTRACT

A data synchronizer (210) transfers data from a data sending circuit (120) to a data receiving circuit (130). The data sending circuit is synchronous with a first clock (SCLK), and a data receiving circuit is synchronous with a second clock (RCLK). The two clocks have equal frequencies but may be out of phase. The synchronizer includes a circular FIFO. The FIFO entries (FF0–FF3) are written synchronously with the first clock (SCLK). The entries' outputs are connected to a multiplexer (230) whose select signals (RSEL0–RSEL3) are generated synchronously with the second clock (RCLK). Multiple entries make their data items available to the multiplexer at the same time. The sender (120) writes a data item and a data valid flag to the FIFO in each cycle of the first clock. The receiver (130) reads the FIFO in each cycle of the second clock. Synchronization between the first and second clock domains is established at reset to ensure that the second clock domain circuitry does not read any given entry too early or too late. After the reset, no signals are transferred from the second clock domain to the first clock domain. In another embodiment, the first clock is an integer multiple of the second clock or vice versa. The synchronizer can be used to resolve clock skew problems that may be caused by propagation delays of clock signals or by any other factors. Other features are also described.

13 Claims, 5 Drawing Sheets

TRANSFERRING DATA BETWEEN DIFFERENT CLOCK DOMAINS

BACKGROUND OF THE INVENTION

The present invention relates to transferring data between different clock domains.

A transfer between different clock domains can be accomplished via a data synchronizer 110 (FIG. 1). Data sending circuit 120 sends data to data receiving circuit 130 through the synchronizer. Data sending circuit 120 is clocked by a clock SCLK. Data receiving circuit 130 is clocked by a different clock RCLK. Synchronizer 110 has a data FIFO 140, a FIFO full logic 150, and a FIFO empty logic 160. When sender 120 has data available for transfer, and the FIFO 140 is not full, the sender stores data in FIFO 140 (by asserting the WR signal). The sender must monitor the FIFO full logic 150 (the signal FULL) to prevent FIFO overrun.

When FIFO 140 is not empty, and receiver 130 is ready, the receiver reads data from the FIFO (by asserting the RD signal). The receiver 130 must monitor the FIFO empty logic 160 (the signal EMPTY) to prevent FIFO underrun.

The interaction between the FIFO full logic, the FIFO empty logic, the sender 120, and the receiver 130 is complex, because actions that change the status of FIFO 140 can occur in either clock domain, and the results of these actions must be communicated to the other clock domain. The signals generated in one clock domain may have to meet the setup and hold time requirements for the other domain. For example, the input of data FIFO 140 is generated synchronously with sender's clock SCLK but the FIFO must meet the setup and hold time requirements with respect to receiver's clock RCLK. This adds a delay and reduces the throughput through the synchronizer.

SUMMARY

The invention is defined by the appended claims which are incorporated into this section by reference. Some features of the invention are summarized immediately below.

In one embodiment, meeting the setup and hold time requirements for the data is made easier because the data are made available to RCLK domain circuitry for more than one cycle of the sender's clock SCLK. Yet the synchronizer throughput is one data item per SCLK clock cycle. The synchronizer has a circular FIFO. Each entry in the FIFO has an output connected to the RCLK domain circuitry. The output of each entry is available to the RCLK domain for more than one SCLK clock cycle. Therefore, it is easier to meet the RCLK domain setup and hold time requirements.

A FIFO full logic and a FIFO empty logic are omitted. The sender writes a data item and a data valid flag to the synchronizer FIFO in each SCLK clock cycle. The receiver reads the FIFO in each RCLK clock cycle. The SCLK and RCLK clocks have the same frequencies. Synchronization between the SCLK domain and the RCLK domain is established at reset to ensure that the RCLK domain circuitry does not read any given FIFO entry too early or too late. After the reset, no signals are transferred from the RCLK domain to the SCLK domain.

In some embodiments, the SCLK and RCLK clocks have different frequencies.

In some embodiments, a synchronizer transfers data from a sender to a receiver which are clocked by the same clock signal but the clock signal has to propagate over unequal distances which results in a clock skew.

The invention is not limited to the embodiments described above. For example, the invention is not limited to embodiments without a FIFO full or FIFO empty logic, or to embodiments in which the synchronization between the RCLK and SCLK domains is established at reset, or other features described above. The invention is defined by the appended claims.

DESCRIPTION OF PREFERRED EMBODIMENTS

Figure 1:
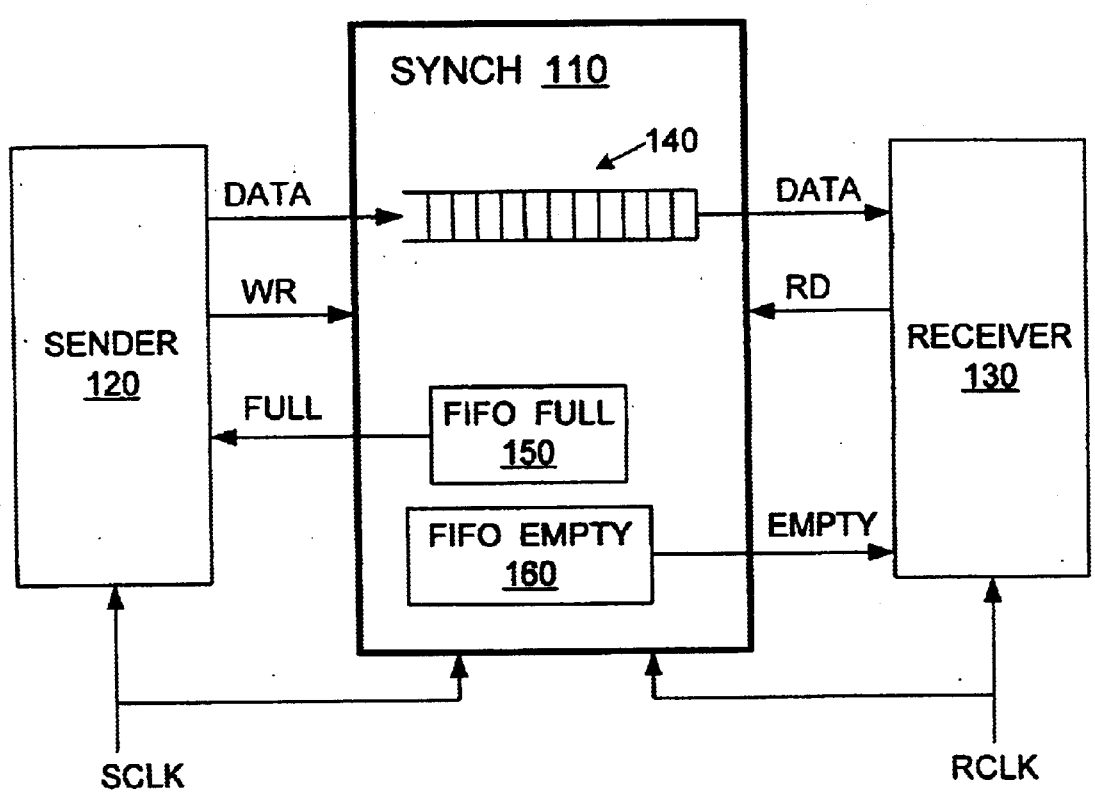
FIG. 1 is a block diagram illustrating operation of a prior art synchronizer.
Figure 2:
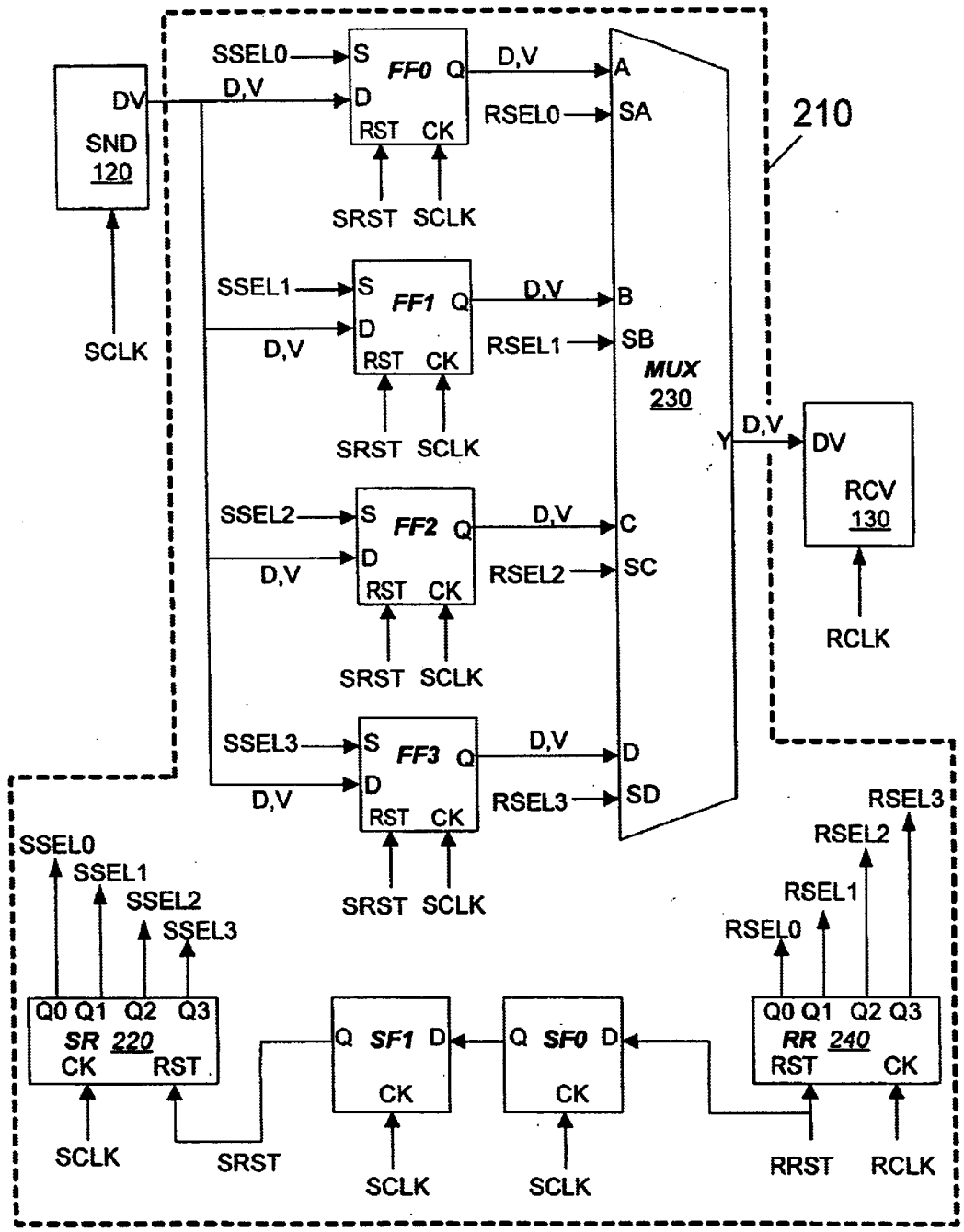
FIG. 2 is a block diagram illustrating operation of a synchronizer according to one embodiment of the present invention.

FIG. 2 illustrates a data synchronizer 210 that transfers data from sender 120 to receiver 130. Sender 120 is clocked by clock SCLK, and receiver 130 is clocked by clock RCLK. Clocks SCLK, RCLK have the same frequency. The sender provides on its output DV a data item D and an associated valid flag V in each SCLK clock cycle. The receiver receives on its input DV a data item D and the associated valid flag V in each RCLK clock cycle. The receiver may latch the D and V signals or some function of these signals if desired.

The synchronizer's circular data FIFO has four storage entries FF0, FF1, FF2, FF3. Each entry is a bank of flip flops storing a data item D and the associated flag V. Each bank receives the D and V signals on its data input D, and provides them on its output Q. The D inputs of the banks FF0–FF3 are connected to the DV output of sender 120.

Each entry FF0–FF3 has a reset input RST receiving a send side reset signal SRST. When the RST input is asserted, the entry sets its valid flag V to "data invalid". The truth table for entries FF0–FF3 is given in Table 1 below.

Select inputs S of entries FF0–FF3 receive respective select signals SSEL0–SSEL3. Each entry can be written only when its S input is asserted. At most one entry is written in any SCLK clock cycle. The entries are written on the rising edge of clock SCLK. (We will assume for ease of description that all the states change on the rising edges of the respective clocks, and the active levels of all signals are high, though this is not necessary.)

Signals SSEL0–SSEL3 are generated by send side rotate circuit ("SR") 220 on its outputs Q0–Q3 synchronously with clock SCLK. SR circuit 220 rotates the SSEL signals, asserting only one signal at a time on each rising edge of clock SCLK, in the order SSEL0, SSEL1, SSEL2, SSEL3, SSEL0, etc. The truth table for SR 220 is given below in Table 2.

The Q outputs of entries FF0–FF3 are connected to respective inputs A, B, C, D of multiplexer 230. Multiplexer 230 has four respective select inputs SA, SB, SC, SD. When a select input is asserted, the data and the valid flag on the respective input A, B, C, or D are transferred to output Y connected to the DV input of receiver 130. The receiver samples its DV input synchronously with clock RCLK.

Sampling involves some use of the signals, e.g. latching the signals or their function. The multiplexer's truth table is given below in Table 3.

The multiplexer's inputs SA, SB, SC, SD receive respective select signals RSEL0, RSEL1, RSEL2, RSEL3 generated by receive side rotate circuit ("RR") 240 on its outputs Q0–Q3 synchronously with clock RCLK. RR circuit 240 can be identical to SR circuit 220.

The SCLK domain circuitry includes sender circuit 120, FIFO entries FF0–FF3, and SR circuit 220. The RCLK domain includes receiver 130 and RR circuit 240. Multiplexer 230 is also in the RCLK domain because the multiplexer select signals RSEL are generated synchronously with RCLK. Flip flops SF0, SF1, described below, are in the SCLK domain.

Figure 3:
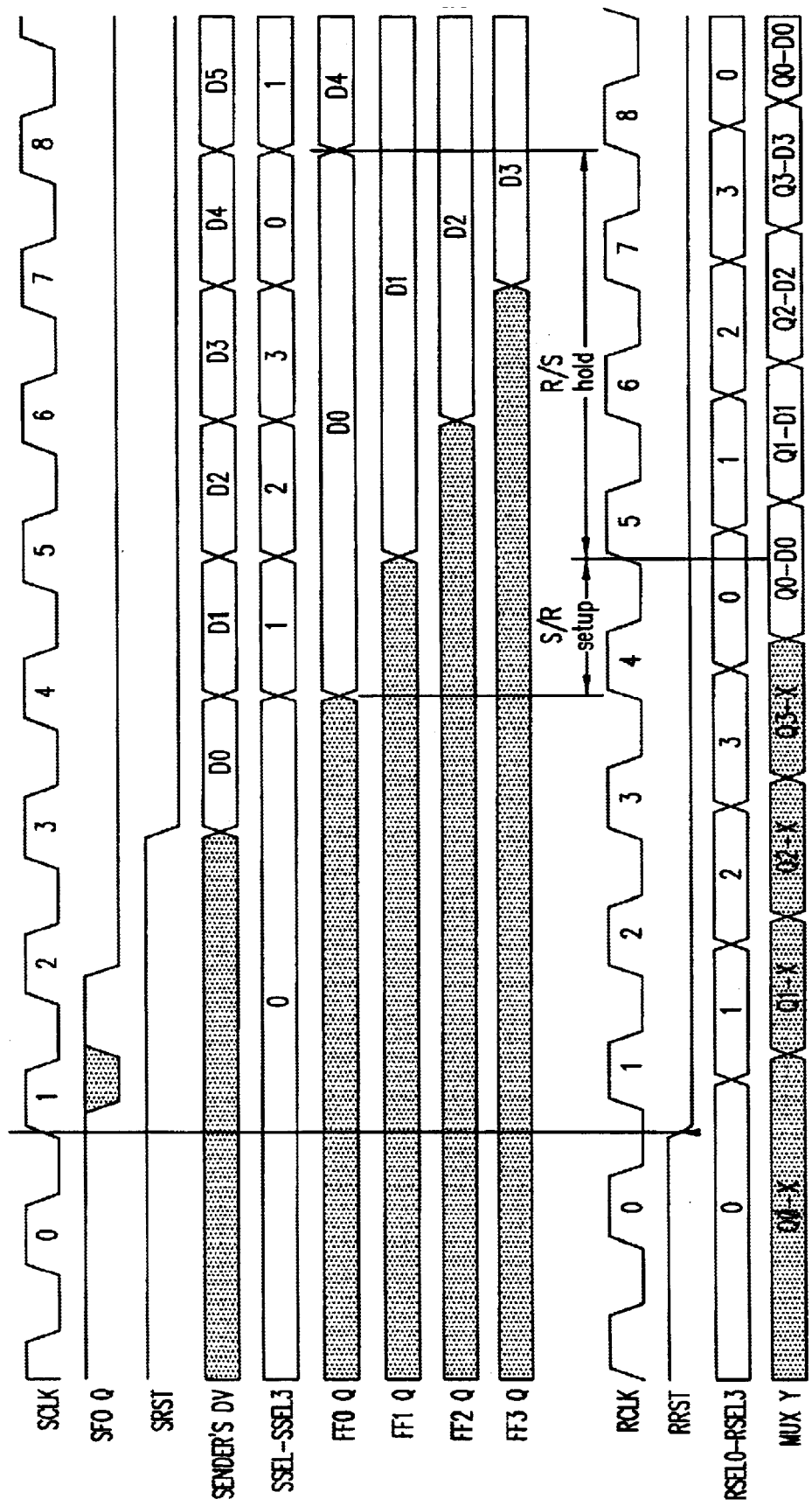
FIGS. 3 and 4 are timing diagrams for the synchronizer of FIG. 2.

FIG. 3 is a timing diagram. The clock cycles are numbered for ease of reference. The numbers appear in the first half of each cycle. We will assume that each clock cycle starts at a rising edge. Sender 120 provides the <D,V> signals D0, D1, D2, D3, . . . on its output DV on the rising edges of respective SCLK cycles 3, 4, 5, 6, . . . . The entry FF0 latches D0 on the rising edge of SCLK cycle 4, right before SSEL0 is deasserted. (In the SSEL diagram, the numbers indicate which of the SSEL signals is being asserted). Entry FF0 provides D0 on its Q output in SCLK cycles 4–7. Entry FF1 latches D1 on the rising edge of SCLK cycle 5 (right before SSEL1 is deasserted), and provides D1 on its Q output in SCLK cycles 5–8; and so on. Each entry FF0–FF3 holds its Q output steady for 4 cycles. (In this example, the asserted signals are assumed high, and the deasserted signals are low, though this is not necessary.)

Multiplexer 230 selects the outputs of entries FF0, FF1, FF2, FF3 in respective RCLK cycles 4, 5, 6, 7, and so on, in a circular manner, as indicated by the RSEL diagram. In particular, entry FF0 (item D0) is selected on the rising edge of RCLK cycle 4, and is used by receiver 130 on the rising edge of cycle 5. The RCLK domain has the entire RCLK cycle 4 to meet the setup requirements of receiver 130. The "S/R setup time" (SCLK/RCLK setup time) measured from the time D0 appeared on the output of entry FF0 to the time D0 was used by receiver 130, is about one clock cycle.

The "R/S hold time" (RCLK/SCLK hold time), measured from the time D0 was used by receiver 130 to the time when D0 was overwritten with D4 in entry FF0, is about 3 clock cycles. The S/R setup time and the R/S hold time are the same for all entries FF0–FF3 for all data items.

The S/R setup time and the R/S hold time are a function of the time delay dRs between the assertion of a signal RSELi (i=0, 1, 2, 3) to read an entry FFi and the assertion of the respective signal SSELi to overwrite the entry. This delay is established at reset. A receive side reset signal RRST is asserted at reset on the RST input of RR circuit 240. In response, RR circuit 240 asserts RSEL0, selecting the entry FF0.

The RRST signal is delivered to the D input of flip flop SF0. Flip flop SF0 has its Q output connected to the D input of flip flop SF1. The signal on the Q output of flip flop SF1 is labeled SRST (send side reset signal). SRST is delivered to the RST inputs of SR circuit 220 and entries FF0–FF3. Flip flops SF0, SF1 are D type flip flops clocked by SCLK. Their truth table is given below in Table 4. When the SRST is asserted, SR circuit 220 asserts SSEL0.

Figure 4:
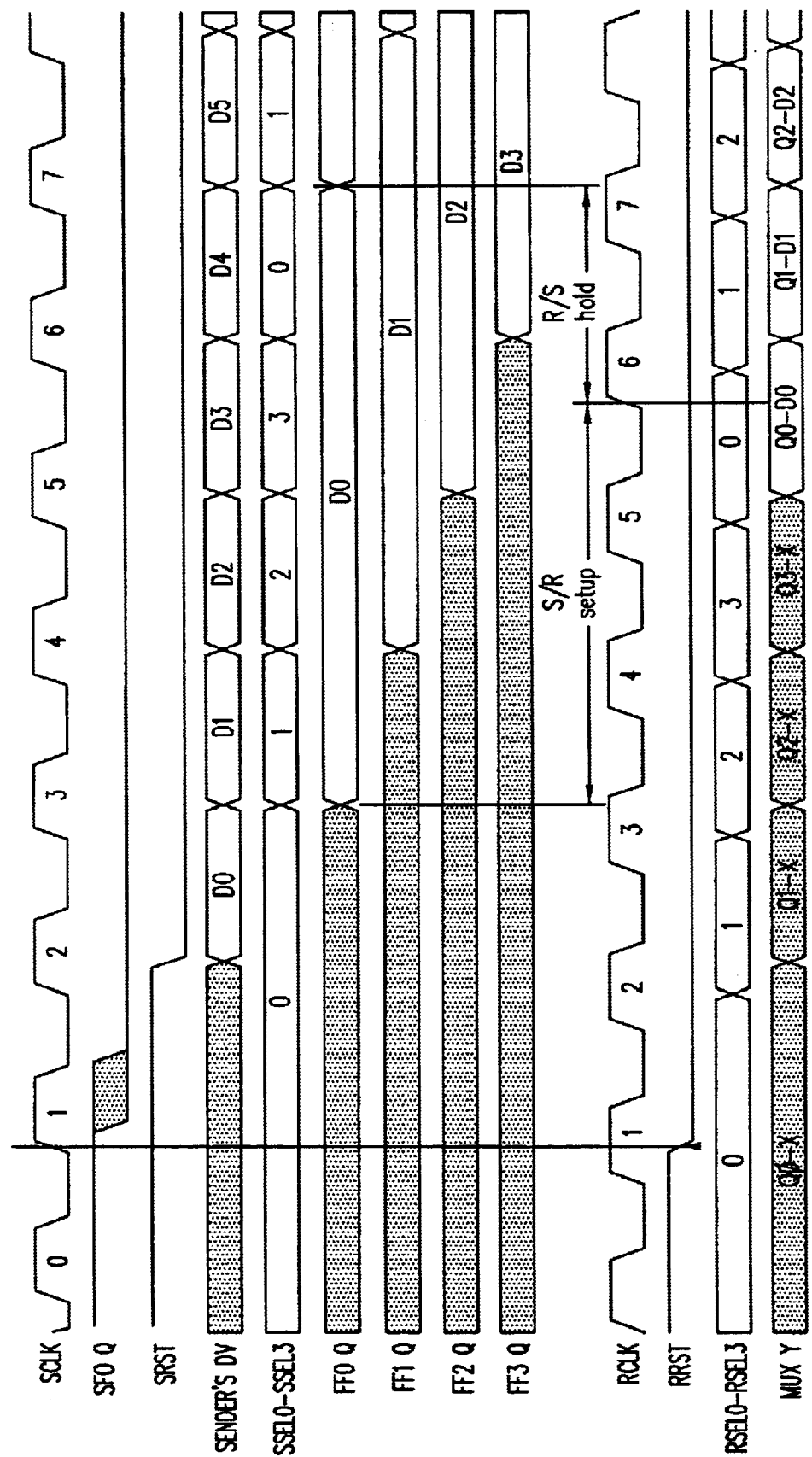

When the reset input RST of RR circuit 240 or SR circuit 220 is deasserted, the circuit starts cycling its outputs Q0–Q3, selecting the respective entries FF0–FF3. Due to the delay through flip flops SF0 and SF1, the RRST signal is deasserted before SRST, so the RSEL signals begin cycling earlier than the SSEL signals. The exact delay between the deassertion of RRST and the deassertion of SRST may vary from one reset period to another as illustrated in FIGS. 3 and 4 and described below. However, the minimum and maximum values of this delay ensure certain minimum values for the S/R setup and R/S hold times.

The timing particulars are as follows. RRST is initially asserted for at least 3 clock cycles, and maybe for a few hundred clock cycles. This guarantees that there will be a period of time in which both RRST and SRST are asserted. When both RRST and SRST are asserted, both RSEL0 and SSEL0 are high, selecting the entry FF0.

In FIG. 3, RRST is deasserted immediately before the rising edge of RCLK cycle 1. Hence on the rising edge of RCLK cycle 1, RR 240 asserts the next select signal RSEL1, then RSEL2, and so on. RRST is deasserted during or immediately after the rising edge of SCLK cycle 1, too late for the flip flop SF0 to latch the low RRST signal. (The SF0 output may become metastable.) The low RRST signal is latched by SF0 only on the rising edge of cycle 2. Therefore, SRST is deasserted on the rising edge of SCLK cycle 3, and SSEL1 becomes asserted on the rising edge of SCLK cycle 4. The time interval $d_{RS}$ from the assertion of RSEL1 to the assertion of SSEL1 is about 3 clock cycles. The R/S hold time is also about 3 clock cycles. The S/R setup time is about 1 clock cycle. (The R/S hold time and the S/R setup time add up to 4 clock cycles.) FIG. 3 is the case of a maximum dRs because the RR circuit 240 registers the deassertion of RRST almost immediately but the flip flop SF0 registers the deassertion of RRST only one clock cycle later.

FIG. 4 illustrates the case of a minimum dRS. Here RRST is deasserted right after the rising edge of RCLK cycle 1, so RSEL1 is asserted only on the rising edge of RCLK cycle 2. Flip flop SF0 latches the low RRST value on the rising edge of SCLK cycle 1, almost immediately after RRST is deasserted, so SSEL1 is asserted on the rising edge of SCLK cycle 3. The R/S hold time is about 1 cycle, and the S/R setup time about cycles.

If the RRST is deasserted immediately before the rising edges of both RCLK and SCLK, the S/R setup and R/S hold times will be about 2 cycles. The same result is obtained if the RRST is deasserted immediately after the rising edges of RCLK and SCLK.

The S/R setup and R/S hold times can be increased by providing more queue entries FFi. The number of serially connected flip flops SFi can be increased as needed. The number of flip flops SFi should be about half of the number of entries FFi if it is desired to make the S/R setup and R/S hold times about equal to each other (plus or minus a few clock cycles), but this is not necessary.

SCLK and RCLK may have different frequencies. Let TS be the period of clock SCLK, and TR be the period of clock RCLK. In one embodiment, TS=n*TR, i.e. the RCLK frequency is an integer multiple of the SCLK frequency. RR circuit 240 changes the RSEL signals every n cycles of receive clock RCLK.

If TR=n*TS, the multiplexer 230 selects a group of n entries FFi simultaneously. The entries are divided into groups, each group containing n consecutive entries FFi of the circular FIFO. For each group, the next group (i.e. the group selected next by the RSEL signals) contains the next entries of the FIFO. Each signal RSELi selects one group, with consecutive signals RESLi selecting consecutive groups in the FIFO. A new group is selected every RCLK clock cycle.

The delay dRST from the deassertion of RRST to the deassertion of SRST can be adjusted as follows. Let NF be the number of entries FFi, and NS be the number of flip flops SFi. The delay dRST is about NS*TS, and its minimum and maximum values are NS*TS and (NS+1)*TS respectively. Therefore, the delay dRST can be adjusted by selecting the number of flip flops SFi.

Additional flexibility for adjusting the delay dRST can be obtained by connecting RRST to the RST input of RR circuit 240 through a number of serially connected D type flip flops clocked by RCLK. If NR is the number of such flip flops, the delay DRST is about:

NS*TS−NR*TR.

The minimum and maximum dRST values are about NS*TS−(NR+1)*TR and about (NS+1)*TS−NR*TR respectively. Therefore, additional dRST adjustment can be made by selecting the number of flip flops between RRST and RR circuit 240.

The serially connected flip flops between RRST and the circuit 240 can be replaced with other kinds of delay circuits. Flip flops SFi can also be replaced with other kinds of delay circuits.

Advantageously, the synchronizer embodiments described above do not transfer any signals from the RCLK clock domain to the SCLK clock domain except during reset. The circuit operation does not depend on any signal generated synchronously with RCLK and sampled synchronously with SCLK except for signal RRST during reset.

Figure 5:
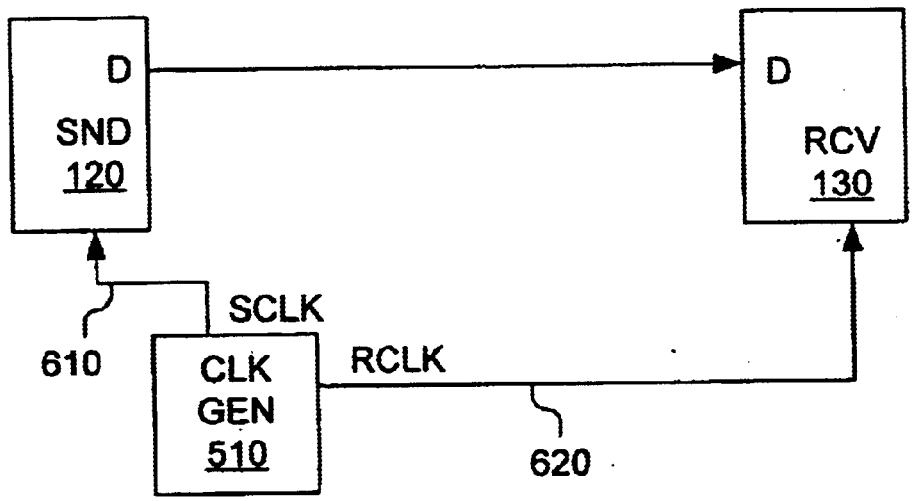
FIG. 5 is a block diagram of a prior art circuit having a clock skew problem.

The synchronizers described above can be used to resolve a clock skew problem illustrated in FIG. 5. Clock generator 510 provides the clocks SCLK, RCLK to sender 120 and receiver 130 respectively. Clocks SCLK, RCLK are generated at the same phase and frequency, but are propagated over different distances because the clock generator is closer to sender 120 than to receiver 130 (or vice versa). Consequently, a clock skew is present. Prior art techniques to resolve this problem include complex clock synchronizer circuits to introduce a delay between the clocks SCLK and RCLK at the clock generator to cause the two clocks to be in phase at sender 120 and receiver 130.

A clock skew may also be present if the sender and the receiver use the same clock (e.g. SCLK) but are at different distances from the clock generator.

Figure 6:
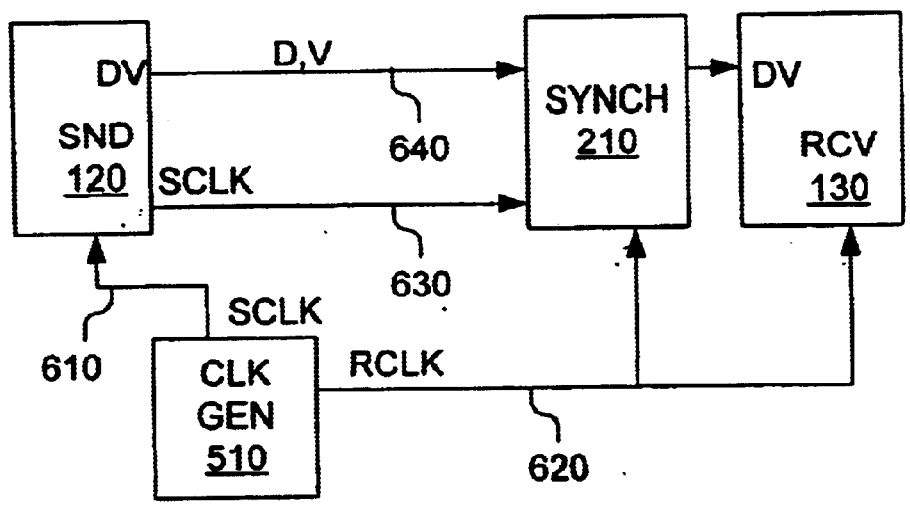
FIG. 6 is a block diagram illustrating the use of a synchronizer according to one embodiment of the present invention to resolve the problem illustrated in FIG. 5.

FIG. 6 illustrates the use of synchronizer 210 to resolve the problem. Clock generator 510 provides the clock SCLK to sender 120 on line 610, and provides the clock RCLK to receiver 130 on line 620, as in FIG. 5. In addition, the clock RCLK is provided to synchronizer 210. The synchronizer is physically close to receiver 130, so the clock RCLK is substantially in phase at the inputs of the receiver and the synchronizer. (The clock is "substantially" in phase in the sense that any phase difference, if present, is so small as not to affect the circuit operation.)

Sender 120 provides the clock SCLK to synchronizer 210 on line 630. The sender drives the D and V signals on its output DV synchronously with clock SCLK. Bus 640 carries these signals to the synchronizer. The clock SCLK on line 630 and the <D,V> signals on line 640 are substantially synchronous with each other at the synchronizer because they travel about the same distance.

This use of synchronizer 210 to resolve the clock skew problem is convenient because it does not depend on the phase difference between the clocks SCLK, RCLK at any point in the circuit, or on the location of clock generator 510. Clocks SCLK and RCLK can be generated by different clock generators, at any phase at any geographic location. The clocks may have the same frequency, or one of the clocks may be an integer multiple of the other.

Sender 120 and receiver 130 can be different integrated circuits on the same or different boards, or they may be part of the same integrated circuit.

The invention is not limited to embodiments described above. For example, flip flops FFi can be replaced with other storage devices, for example, with a dynamic random access memory or other types of memory. Clock SCLK may have different versions generated to have the same phase and frequency and provided to different inputs of the synchronizer. For example, flip flops SF0, SF1 may receive different versions of SCLK. Likewise, different versions of RCLK may be used. Other embodiments and variations are within the scope of the invention, as defined by the appended claims.

ADDENDUM

Truth Tables for the Embodiment of FIG. 2

TABLE 1

FIFO ENTRY (FF0–FF3)

| CK | RST | S | D(t) | Q(t + 1) |
|---|---|---|---|---|
| Don't Care | Active | Don't Care | Don't Care | V: Data invalid |
|  |  |  |  | Data: Don't care |
| Rising Edge | Inactive | Inactive | Don't Care | No change |
| Rising Edge | Inactive | Active | Data, V | Data & V |
| Falling Edge | Inactive | Don't care | Don't Care | No change |
| 0 | Inactive | Don't care | Don't Care | No change |
| 1 | Inactive | Don't care | Don't Care | No change |

D(t) is the D input on a rising edge t of the clock on input CK.
Q(t + 1) is the Q output on the next rising edge of CK.
"Data" is the D portion of the <D, V> signal.

TABLE 2

SR AND RR

| CK | RST | Q0(t) | Q1(t) | Q2(t) | Q3(t) | Q0(t + 1) | Q1(t + 1) | Q2(t + 1) | Q3(t + 1) |
|---|---|---|---|---|---|---|---|---|---|
| Don't Care | Active |  | Don't Care |  |  | Active | Inactive | Inactive | Inactive |
| Rising | Inactive | Active | Inactive | Inactive | Inactive | Inactive | Active | Inactive | Inactive |
| Rising | Inactive | Inactive | Active | Inactive | Inactive | Inactive | Inactive | Active | Inactive |
| Rising | Inactive | Inactive | Inactive | Active | Inactive | Inactive | Inactive | Inactive | Active |
| Rising | Inactive | Inactive | Inactive | Inactive | Active | Active | Inactive | Inactive | Inactive |
| Falling | Inactive |  | Don't Care |  |  |  | No change |  |  |
| 0 | Inactive |  | Don't Care |  |  |  | No change |  |  |
| 1 | Inactive |  | Don't Care |  |  |  | No change |  |  |

TABLE 2-continued

SR AND RR

| CK | RST | Q0(t) | Q1(t) | Q2(t) | Q3(t) | Q0(t + 1) | Q1(t + 1) | Q2(t + 1) | Q3(t + 1) |
|----|-----|-------|-------|-------|-------|-----------|-----------|-----------|-----------|

Q0(t + 1)–Q3(t + 1) are the states of outputs Q0–Q3 in clock CK cycle t + 1 assuming the states Q0(t)–Q3(t) in the previous clock cycle t.
When reset (RST) is active, SR 220 selects FF0.
After reset, SR 220 selects the same FIFO entry once every four clock cycles.

TABLE 3

MULTIPLEXER 230

| A | B | C | D | SA | SB | SC | SD | Y |
|---|---|---|---|----|----|----|----|---|
| DA | Don't Care | Don't Care | Don't Care | Active | Inactive | Inactive | Inactive | DA |
| Don't Care | DB | Don't Care | Don't Care | Inactive | Active | Inactive | Inactive | DB |
| Don't Care | Don't Care | DC | Don't Care | Inactive | Inactive | Active | Inactive | DC |
| Don't Care | Don't Care | Don't Care | DD | Inactive | Inactive | Inactive | Active | DD |

TABLE 4

FLIP FLOPS SF0, SF1

| CK | D(t) | Q(t + 1) |
|----|------|----------|
| Rising Edge | 0 | 0 |
| Rising Edge | 1 | 1 |
| Falling Edge | Don't Care | No change |
| 0 | Don't Care | No change |
| 1 | Don't Care | No change |

D(t) is the data input on the rising edge t at clock input CK (receiving SCLK).
Q(t + 1) is the output Q on the next rising edge t + 1.

Notes:

Delay through SF0 and SF1 can be as short as one clock cycle, or as long as two clock cycles.

SR, RR, FF0, FF1, FF2, FF3, and MUX 230 together form a circular FIFO. The <D,V> data to be transferred remain in the SCLK clock domain, and are not synchronized to the RCLK domain.

RRST and SRST high periods overlap. During this overlap, SR 220 and RR 240 both select the same entry. (This is not necessary however. SR 220 and RR 240 may select different entries. The delay logic SF0, SF1 can be adjusted, e.g. more SFi flip flops can be provided.)

In FIG. 2, the delay logic (SF0, SF1) ensures SRST remains active for at least one clock cycle after RRST becomes inactive. It also ensures SRST becomes inactive no later than two cycles after RRST becomes inactive.

Since the "data constant window" is four clock cycles wide, the delay logic positions the sample point (the point at which the output of FFi is sampled by receiver 130) near the center of this window.

What is claimed is:

1. An apparatus comprising a data synchronizer comprising:
   data storage entries;
   a first circuit for selecting the entries to store data therein;
   a second circuit for selecting the entries to read data therefrom such that if any given data item d1 is stored in any entry e1 earlier than another data item d2 is stored in any other entry e2, then d1 is read from e1 earlier or at the same time as d2 is read from e2;
   wherein the entries have outputs for providing the stored data, and at least a plurality of the entries have their outputs connected to the second circuit, wherein each of said entries is to hold its data item on its output longer than an interval of time between selection of different entries by the first circuit;
   wherein the synchronizer further comprises:
      one or more inputs for receiving a first clock signal or signals which synchronize the operation of the first circuit and the storing of data in the entries; and
      one or more inputs for receiving a second clock signal or signals which synchronize the operation of the second circuit.

2. The apparatus of claim 1 further comprising a data receiving circuit for receiving data from the entries selected by the second circuit, wherein the data receiving circuit is to sample each selected data item from the entries synchronously with the second clock signal or signals;
   wherein the synchronizer provides a first delay from the time that a data item appears on an entry's output to the time the item is sampled by the data receiving circuit, and the synchronizer provides a second delay from the time that the data receiving circuit samples the data item to the time the respective output is overwritten with another data item, wherein for given frequencies of the first and second clock signal or signals, the first and second delays have minimal positive values independent of any phase difference between the first and second clock signal or signals.

3. The apparatus of claim 2 wherein:
   the first circuit selects different entries at consecutive intervals of time when the first circuit exits its reset state;
   the second circuit selects different entries at consecutive intervals of time when the second circuit exits its reset state;
   wherein upon reset a period of time is provided when the first and second circuits are both in their respective reset states; and
   the delay is provided by establishing which entry or entries the first circuit selects immediately upon exiting its reset state, and which entry or entries the second circuit selects immediately upon exiting its reset state.

4. The apparatus of claim 3 wherein after the first and second circuits exit their reset states the synchronizer operation does not depend on any signals generated synchronously with the second clock signal or signals and sampled synchronously with the first clock signal or signals.

5. The apparatus of claim 1 wherein the first clock signal or signals and the second clock signal or signals have the same frequency.

6. The apparatus of claim 1 wherein the first clock signal or signals are integer multiples of the second clock signal or signals, or the second clock signal or signals are integer multiples of the first clock signal or signals.

7. The apparatus of claim 1 wherein:
each entry stores a data item and information on whether the data item is valid;
the entries are to be written at regular intervals of time measured by the first clock signal or signals, with at least one entry written in each of said intervals of time;
the entries are to be read at regular intervals of time measured by the second clock signal or signals, with at least one entry read in each of the intervals of time measured by the second clock signal or signals.

8. The apparatus of claim 1 further comprising:
a data sending circuit for providing data to the synchronizer synchronously with the one or more first clock signals; and
a data receiving circuit for using data read from the synchronizer synchronously with the one or more second clock signals;
wherein after reset, the operation of the apparatus does not depend on any signals generated synchronously with the second clock signal or signals and sampled synchronously with the first clock signal or signals.

9. The apparatus of claim 1 further comprising:
a data sending circuit providing data to the synchronizer synchronously with the first clock signal or signals;
a data receiving circuit using the data read from the synchronizer synchronously with the second clock signal or signals;
wherein the synchronizer is sufficiently physically close to the data receiving circuit so that there is substantially no clock skew of the second clock signal or signals between the inputs of the second circuit and the inputs of the data receiving circuit;
wherein at the inputs of the first circuit the data are substantially synchronous with the first clock signal or signals.

10. The apparatus of claim 1 wherein the second circuit comprises:
a multiplexer having data inputs connected to the outputs of the entries; and
a circuit for generating select signals for the multiplexer synchronously with the one or more second clock signal or signals.

11. A method for transferring data form a first clock domain defined by a first clock signal to a second clock domain defined by a second clock signal, the method comprising:
storing sequentially provided data items in entries of a circular FIFO synchronously with the first clock signal, wherein the entries are selected for storage in a circular order of the FIFO, wherein when any data item is stored in an entry, the entry provides the data item on the entry's output until the entry is overwritten with another data item;
selecting the outputs of the entries synchronously with the second clock signal for sampling the data on the outputs, wherein the outputs are selected for sampling in the circular order of the FIFO.

12. The method of claim 11 wherein the data items are stored in the FIFO at regular time intervals measured by the first clock signal, and in each of the time intervals the FIFO receives a data item and information indicating if the data item is valid.

13. The method of claim 11 further comprising:
asserting a receive reset signal to reset the output selection operation so that the output selection operation begins with selecting a predetermined output or outputs when the receive reset signal is deasserted;
asserting a send reset signal to reset the data storing operation so that the data storing operation begins with storing data in a predetermined entry or entries when the send reset signal is deasserted;
deasserting the receive reset signal and the send reset signal at different times to cause the output selection operation for any data item in any data entry to be delayed from the data item storing operation for the data entry.

* * * * *